Figure 4:
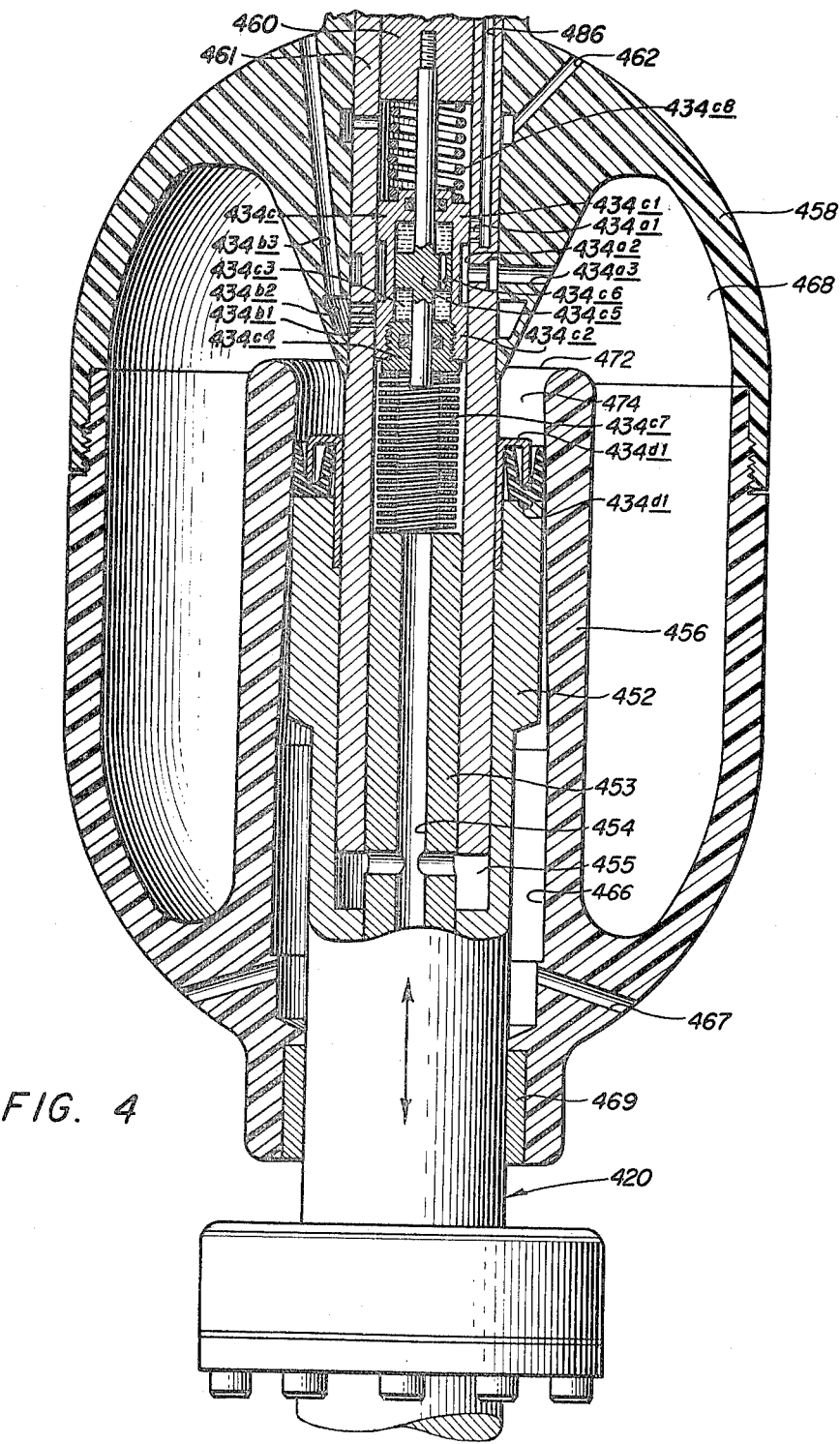

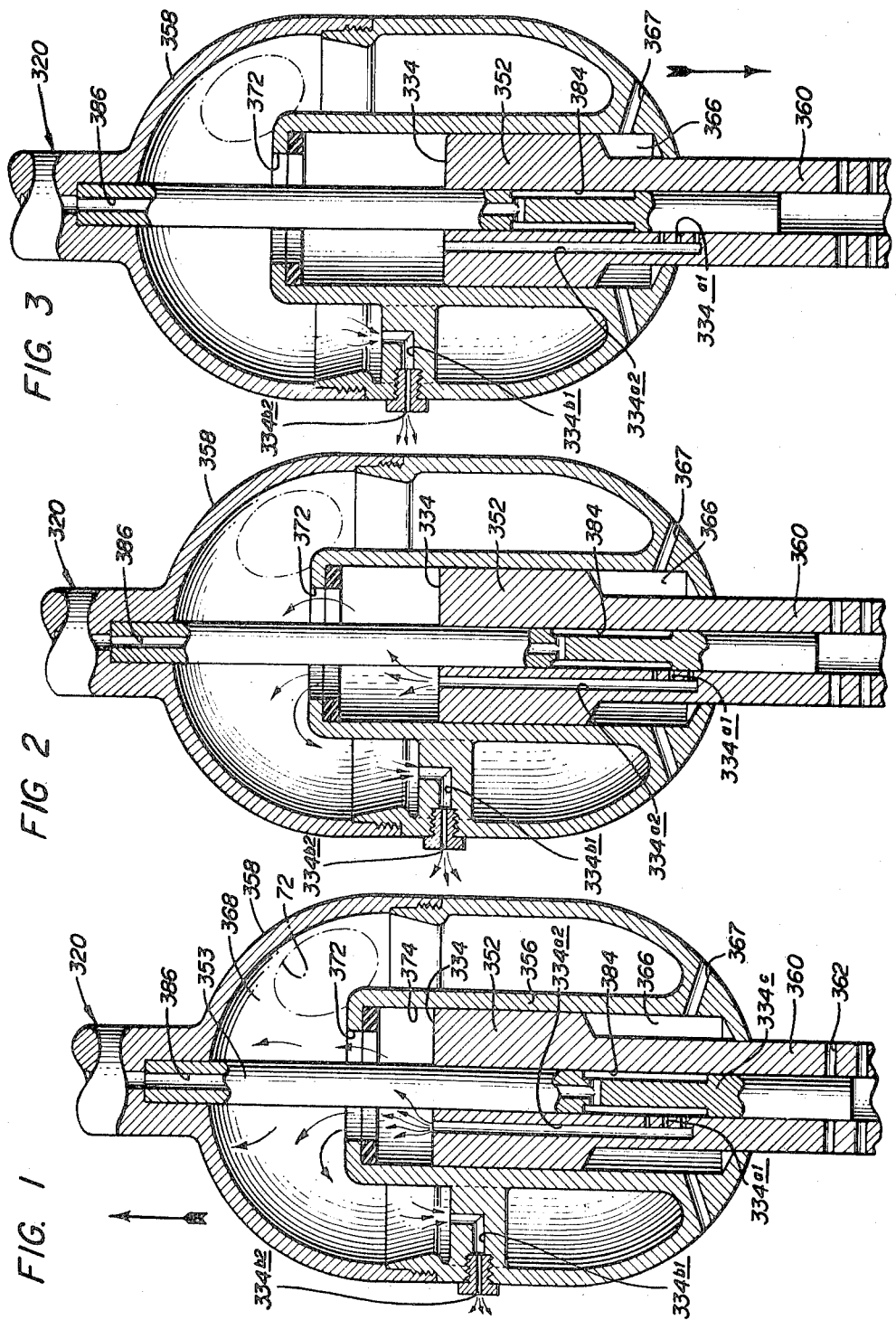

United States Patent Office 3,214,155
Patented Oct. 26, 1965

3,214,155
PNEUMATIC VIBRATION ELIMINATOR
Charles Leavell, 206 S. Fairfield Ave., Lombard, Ill.
Filed Apr. 9, 1962, Ser. No. 186,177
12 Claims. (Cl. 267—1)

This invention relates to the elimination of vibration, and it is especially useful in tripartite vibratile structural compositions comprising (1) a desirably or unavoidably vibrating body, (2) a second body in which the occurrence of vibration is objectionable, and (3) connecting structure or linkage accomplishing the necessary transmission of force between the two bodies. The invention has utility in a wide variety of environments and, by way of illustration, percussive tools, automobile bodies, flywheel and other rotor supports, supports for machines generating yet more complex vibrations, and automobile and other drive shafts actuated by non-uniform torque may be taken as specific examples.

The present application is a continuation-in-part of my copending patent application, Serial No. 742,878, filed June 18, 1958, now Patent No. 3,028,841, which discloses a vibration-isolating, force-transmitting linkage of general utility in the exemplary environment of a percussive tool structure, and explains that the greater part of anti-vibration research pertains to the tripartite mechanical combination of (1) a desirably or unavoidably vibrating body, (2) a second body in which the occurrence of vibration is objectionable, and (3) connecting structure accomplishing a necessary transmission of force between the two bodies. Such copending application also explains that the problem of greatest concern in such tripartite vibratile mechanical combinations is that of maintaining the necessary transmission of force between such two bodies, and at the same time minimizing the communication of vibration therethrough from the desirably or unavoidably vibrating body to the second body in which the occurrence of vibration is undesirable.

Additionally, such copending application introduces a system for classifying vibrations in terms of the degrees of complexity of the paths traced in space by their vibratory motions; and specifically, the distinctions relative to path-complexity defined as in analytic geometry, in terms of the fewest-dimensioned spaces capable of containing such paths, are used for such classification. Accordingly, vibration is classified with reference to a path traced by it as being either (A) a 1-dimensional or linear vibration, or (B) a 2-dimensional or planar vibration, or (C) a 3-dimensional or solid vibration, depending on whether (a) such path can exist within a straight line, or (b) not being capable of such confinement within a straight line, can exist within a plane, or (c) not being capable of such confinement within a plane, can exist within a solid space (i.e., a volume).

As noted in the aforementioned copending application, if the element exhibiting the vibration to be categorized in accordance with this classification scheme is a ponderable body of greater dimensions than a geometric point, the question arises as to just what point either upon its surface or within its mass is to be taken as tracing the path with respect to which the vibratory motion of the element will be classified as being either 1-, 2-, or 3-dimensional (or linear, planar, or solid), and it may be stated in general that the center of gravity of such a body can be used conveniently as the determining point. In other words, the vibratory motion of the body will generally be classified in accordance with the nature of the path traced by its center of gravity.

However, since any such ponderable body may (or may not) exhibit an angular vibration about its center of gravity simultaneously with the description of a path by the center of gravity, and also when its center of gravity is stationary, the classification system was expanded in such prior application to include the following seven cases:

(I)

(a) Vibratory motion of a body comprising a linear vibration of its center of gravity associated with a condition of no angular vibration of the body.

(b) Vibratory motion of a body comprising a linear vibration of its center of gravity associated with an angular vibration about its center of gravity.

(II)

(a) Vibratory motion of a body comprising a planar vibration of its center of gravity associated with a condition of no angular vibration of the body.

(b) Vibratory motion of a body comprising a planar vibration of its center of gravity associated with an angular vibration about its center of gravity.

(III)

(a) Vibratory motion of a body comprising a solid vibration of its center of gravity associated with a condition of no angular vibration of the body.

(b) Vibratory motion of a body comprising a solid vibration of its center of gravity associated with an angular vibration about its center of gravity.

(IV)

Vibratory motion of a body comprising an angular vibration about its center of gravity associated with a stationary condition of its center of gravity.

As stated hereinbefore, such copending application, Serial No. 742,878, discloses a vibration-isolating, force-transmitting linkage of general utility useful in connection with the elimination of 1-, 2-, and 3-dimensional vibrations, and specifically exemplifies such linkage in application to the elimination of 1-dimensional or linear vibratory motion coming within Division I(a) of the foregoing classification system. The application of such linkage to the elimination of 2-, and 3-dimensional vibratory motions coming within Divisions II(a) and III(b) of the foregoing classification system, and in application to the elimination of angular vibration of a body about its center of gravity coming within Division IV of such classification system are respectively disclosed in copending patent applications, Serial No. 185,988, filed April 9, 1962, and Serial No. 186,039, filed April 9, 1962, now Patent No. 3,136,143, granted June 9, 1964. Additionally, copending patent application, Serial No. 185,965, filed April 9, 1962, discloses the embodiment of such linkage in a suspension system especially useful with road vehicles; and copending patent application, Serial No. 186,198, filed April 9, 1962, discloses the embodiment of such linkage in a 2-casing percussive tool.

A vibration-isolating, force-transmitting linkage structure in the form of a constant-force linkage of pneumatic type made operative by the maintenance of pressures of constant values as the force-transmitting media, and which is effective to eliminate vibration as opposed to the mere reduction in amplitude thereof as is characteristic of most prior art teachings, was disclosed in Leavell et al. Patent No. 2,400,650, illustratively applied between ordinary vibrating pneumatic paving breakers and outer handle-bearing casings therefor, to provide externally vibrationless concrete-breaking tools for hand-held use. One of the important purposes of copending application, Serial No. 742,878, is that of disclosing an entirely automatic instance of control means for such constant-force linkages to continuously maintain the solid parts thereof in a stable condition of intermediacy such that certain vibration-generating configurations of the solid parts are substantially prevented; which then is an improvement of the pneumatic linkage disclosed in prior Patent No. 2,400,650, which necessitated manual control over the linkage in order to prevent such vibration-generating configurations of such parts thereof.

The aforementioned pneumatic linkages provide a constant-force which is continuously operative between the vibrating body 1 and the second body 2, in which the occurrence of vibration is objectionable, by defining such force through a pneumatic column contained within a relatively large constant-pressure space, the total volume of which is sufficiently large relative to the changes therein caused by the vibratory displacements of the body 1 that substantially no change in pressure occurs within such space as a consequence of such displacements.

The present invention has for one of its objects an improvement in such force-transmitting linkage composition which permits the total volume of such constant-pressure space to be substantially reduced and, in certain instances, completely eliminates the requirement for a constant-pressure volume exceeding that which defines the actual pneumatic column operative between the two bodies.

The aforementioned automatic control means is characterized by expending air in a substantially continuous manner all during its operation, in that air is supplied at all times to the constant-pressure space through a restricted infeed orifice and is permitted to escape therefrom through a permanently open exhaust outlet except during certain intervals of corrective action by the control means when it is necessary to increase the value of the pressure within such constant-pressure space. The present invention has for another of its objects an improved control means which expends no air except during the relatively brief intervals in which corrective actions are being taken by the control means.

Still another object of the invention is to provide, in one instance, an improved control means in which the corrective responses thereof are attenuated and essentially converted into a continuous function, as opposed to what is essentially a step function in the control means disclosed in the prior application, Serial No. 742,878; and, in another instance, make the corrective actions of the control means responsive to the mean position of the range of vibratory displacements of the vibrating body 1 and elements of the control means attached thereto or carried thereby, as opposed to the condition in which the control means attempts to respond to each vibratory displacement of the vibrating body 1.

Additional objects and advantages of the invention will become apparent as the specification develops.

Exemplary embodiments of the invention are illustrated in the accompanying drawings in which:

FIGURES 1, 2 and 3 are each a vertical sectional view of a structure embodying an improved vibration-isolating, force-transmitting linkage, and respectively illustrate the same in various operating conditions thereof; and FIGURE 4 is a vertical sectional view of a structure embodying a further improved vibration-isolating, force-transmitting linkage.

The structural composition illustrated in FIGURES 1 through 3 includes a desirably or unavoidably vibrating body indicated generally at 320, and a body in which the occurrence of vibration is objectionable, indicated generally with the numeral 360. As stated hereinbefore the bodies 320 and 360 are exemplary of the bodies 1 and 2 of a wide variety of tripartite vibratile mechanical combinations. The bodies 320 and 360 are force-coupled by connecting structure or linkage that accomplishes a necessary transmission of force between the two bodies.

Rigidly related to the body 320 is a casing 358 defining a relatively large chamber 368 therein. Formed integrally with the casing 358 and positioned within the chamber 368 is a casing element 356 defining therein a cylinder 374. The longitudinal axis of the cylinder 374 is coaxial with the vibratory axis of the body 360, which has rigidly connected thereto a piston 352 which is reciprocable within the cylinder. The cylinder casing 356 is turned inwardly at its upper inner end, and is provided with a large central opening 372 that has a resilient pad secured to the inner surface thereof. The lower end portion of the cylinder 374 is maintained at atmospheric pressure through a plurality of vent passages 367. The casing 358 is formed in two sections threadedly secured to each other to provide access to the interior of the chamber 368 and, while the cylinder casing 356 is shown as being integral, it will be appreciated that the cylinder casing may be a segmented component to permit insertion of the piston 352 thereinto, and that such segments may be welded or otherwise rigidly related following such insertion of the piston.

The piston 352 is provided with a longitudinally extending bore or passage therein that slidingly and sealingly receives a rod or stem 353 which, at its upper end, is attached to the casing 358 as by being sweated into a bore or recess provided therefor. The piston 352 is reciprocable with respect to the rod 353, and the rod is provided with an intermediate portion of reduced cross section that defines with the circumjacent walls of the piston 352 an annular chamber 384.

Pressure fluid, compressed air, for example, is continuously supplied to the annular chamber 384 through a longitudinally extending passage 386 extending along the longitudinal axis of the rod 353. The passage 386 is connected with an appropriate source of such pressure fluid by means of a communicating passage in the body 320. Fluid present within the annular chamber 384 is adapted to flow therefrom through a restricted infeed orifice $334^{a1}$ that is connected to a passage or flow conduit $334^{a2}$ formed in the piston 352. The composite volume defined by the chamber 368 and that portion of the cylinder 374 in open communication therewith constitutes a constant-pressure space that is supplied with pressure fluid from the piston conduit $334^{a2}$. Fluid within the constant-pressure space continuously escapes therefrom through a passage $334^{b1}$ and exhaust outlet $334^{b2}$ that communicates therewith.

The restricted inlet orifice is adapted to be traversed by a piston element $334^c$ that comprises the lower end portion of the rod 353. That portion of the longitudinally extending passage in the piston 352 which is located below the rod 353 in maintained at atmospheric pressure through one or more vent openings 362. It is apparent from the drawings that the lower end portion of the piston 352 is of reduced cross section and extends through an opening provided therefor in the casing 358; and, since such reduced cross section extends into the cylinder 334, the lower end portion of the cylinder constitutes with the piston an annular chamber 366 that is communication with the vent passages 367.

It will be noted that the vent passages 367 communicate with the annular chamber 366 a spaced distance above the lowermost extremity thereof, and the reduced portion of the piston 352 sealingly extends through the casing 358.

Relative movement may occur between the piston 352 and cylinder 374 within the limits defined at one end of the cylinder by the resilient pad or cushion carried thereat, and at the other end by a resilient air cushion developed within the annular chamber 366 between the lower end of the piston 352 and lowermost end of the casing 358 whenever the lower end of the piston moves past the vent passages 367. Therefore, stop means are provided which define the extreme limits of the range of reciprocatory movement of the piston 352 within the cylinder 374.

The piston 352 has a transversely oriented upper end surface 334, and the pressure fluid within the constant-pressure space acts downwardly thereagainst and, necessarily, acts upwardly against the opposed surfaces provided by the casing 358—such opposed surfaces being provided in part by the cylinder casing 356 and resilient pad carried thereby, and in part by the inner, upper surface of the casing 358. The volume of the constant-pressure space may be made as large as necessary in order to maintain the pressure therein substantially constant throughout any vibratory displacement of the body 320, and this is indicated by the inclusion of a connecting port or opening 72 through which the constant-pressure space may be placed in communication with a large back-up tank. Any such opening 72 should be sufficiently large that no pressure gradients occur in the fluid flowing therethrough, and the area of the opening 372 should be relatively large for the same reason.

The stable relative position of the bodies 320 and 360 is illustrated in FIGURE 2, and in such stable position the restricted inlet orifice $334^{a1}$ is partially uncovered by the control piston $334^c$. Consequently, pressure fluid is continuously flowing into the constant-pressure space through the inlet orifice, and is escaping therefrom through the exhaust outlet $334^{b2}$. The pressure developed within the constant-pressure space defines a pressure force operative between the relatively reciprocable opposed surfaces of the piston 352 and casing 358 (and cylinder casing 356), which tends to maintain the bodies 320 and 360 in such stable position with a given load or force acting downwardly on the body 320.

If such load or force is suddenly increased in magnitude, the body 320 and casing 358 will be displaced downwardly relative to the piston 352 and body 360, as shown in FIGURE 1. As a consequence thereof, the control piston $334^c$ uncovers the infeed orifice to a greater extent, whereupon there is an increased flow of pressure fluid into the constant-pressure space. Such increased flow continues until the pressure within the space increases to a value sufficient to displace the casing 358 and body 320 upwardly, and return the components to their prior stable position, which is shown in FIGURE 2. The upwardly oriented arrow in FIGURE 1 indicates the direction of movement of the body 320 to return the same to its prior stable position after an increase in the magnitude of the load enforced thereon.

If the magnitude of such load is suddenly decreased, the casing 358 and body 320 will be displaced upwardly, as shown in FIGURE 3; and, as a consequence, the control piston $334^c$ will cover the inlet orifice to a greater extent (completely closing such orifice if the change in the magnitude of the loading force is sufficiently great), and the admission of pressure fluid into the constant-pressure space will be reduced or terminated. Therefore, the continued escape of fluid from the constant-pressure space will result in a reduction in the pressure therein, and the pressure will continue to decrease in value until the casing 358 and body 320 are returned to their prior stable position, as shown in FIGURE 2. The downwardly oriented arrow in FIGURE 3 indicates the direction of the corrective movement of the casing and body 320.

The pressure within the constant-pressure space remains substantially constant for any vibratory displacement of the body 320 which, in one instance, will reciprocate the casing 358 and casing element 356 downwardly relative to the piston 352, and, in the other instance will reciprocate the casing 358 and cylinder casing 356 upwardly relative to the piston 352. As stated hereinbefore, the reason that the pressure remains constant during any such vibratory displacement is that the volume of the constant-pressure space is sufficiently great relative to changes therein that necessarily accompany relative vibratory movement between the piston 352 and cylinder casing 358 that substantially no pressure change occurs.

It is apparent then that the apparatus includes a vibration-isolating, force-transmitting linkage operative to transmit a substantially constant-force between a body that is necessarily or unavoidably subject to vibratory displacements, and a body in which the occurrence of vibrations is undesirable, so that substantially no vibration is transmitted therebetween; and which is also operative to automatically and regulatively vary the value of such transmitted force in accordance with and to compensate for changes in the magnitude of any loading force, tending to effect relative movement between the bodies to compensate for such changes, and thereby provide a force-invariable positional stability on the bodies in which they are continuously maintained in a condition of intermediacy or impact-preventing separation therebetween.

The embodiment of the invention illustrated in FIGURE 4 is in many respects similar to the structural composition illustrated in FIGURES 1 through 3, and described in detail hereinbefore. Therefore, the same reference numerals are employed where appropriate except that the order thereof has been raised to the four hundred series.

Therefore, the structure shown in this figure is a tripartite vibratile composition including a vibratory element 420 and an element 460 in which the occurrence of vibration is objectionable or undesirable. Rigidly affixed to the body 460 is a casing 458 made in two parts and defining a chamber 468 therein. Mounted interiorly of the casing within the chamber 468 is a casing element or cylinder casing 456 defining a cylinder 474 therein. The cylinder communicates with the chamber 468 through a large opening 472 at its upper end, and together the chamber 468 and that portion of the cylinder 474 in communication therewith define a constant-pressure space.

The cylinder 474 has a varying diameter, at least along a portion of the length thereof, and in particular such varying diameter defines a tapered configuration, the minimum dimension of which is located adajcent the upper inner end of the cylinder near the opening 472 thereof. Reciprocable within the cylinder 474 is a piston 452 equipped at its upper end with seal means $434^{d2}$, which is held in place by a retainer $434^{d1}$. The seal means has a variable radial dimension so that it continuouly maintains a sealing relation between the piston 452 and circumjacent walls of the cylinder 474. In the particular form shown, the seal is U-shaped in cross section, and is exemplary of various sealing means that may be employed which have the characteristics of a varying radial dimension or outer diameter. Other sealing means that might be employed are disclosed, for example, in the following patents: 2,949,787, 2,785,825, 3,012,546, 2,983,480, 2,895,494, 2,723,908, 2,850,909, 2,882,137, and 2,737,453.

The piston 452 has a reduced diameter along the lower end portion thereof, and extends outwardly through the lower end of the casing through a bearing 469 that stabilizes the piston during reciprocatory movements thereof. The piston is rigidly related to the vibratory body 420, and the lower end portion of the cylinder 474 is vented to atmosphere through one or more vent passages 467 that communicate with an annular chamber 466 defined between the reduced lower end portion of the piston and circumjacent walls of the cylinder casing 456. Carried by the piston 452 for reciprocable movement therewith is an elongated tube 453 that is mounted within a passage provided therefor in the piston and extends along the longitudinal axis thereof. The tube 453 defines a central passage 454 extending therethrough which opens to atmosphere and communicates through appropriate transverse ports with a chamber 455 that is formed within the piston by an elongated tubular sleeve 461 which is rigidly secured to the casing 458.

The sleeve 461 is circumjacent the tube 453, and the piston 452 is circumjacent the sleeve. Therefore, these three components are coaxially related, and the piston 452 slidably engages the outer surface of the sleeve, while the tube 453, which is carried by the piston, slidably engages the inner surface of the sleeve. It should be noted that the trensverse ports, which connect the passage 454 with the chamber 455, are spaced slightly above the lower end closure of such chamber so that the lower end closure and lower edge of the sleeve 461 define opposed relatively reciprocable surfaces, and an air cushion is formed therebetween when the transverse ports are displaced upwardly relative to the sleeve 461 and into the interior thereof.

Seated within the sleeve 461 on the upper end of the tube 453 is a flat helical spring $434^{c7}$ that, at its upper end, seats against a plug $434^{c4}$ that is threaded into the lower end of control element $434^{c}$. The element $434^{c}$ has an intermediate area of reduced cross section that separates a pair of control pistons $434^{c1}$ and $434^{c2}$ adjacent the opposite ends thereof. The control element is slidably and sealingly related to the circumjacent inner walls of the tubular sleeve 461, and the spring $434^{c7}$ biases the control element upwardly, as viewed in FIGURE 4. This upward biasing force of the spring is resisted by the biasing force of a helical spring $434^{c8}$ which, at its lower end, seats against the conrtol element and, at its upper end, seats against the body 460.

The element $434^{c}$ has a longitudinally extending chamber or cylinder $434^{c3}$ therein, in which is mounted for reciprocable movement a piston $434^{c5}$ that has a restricted flow passage $434^{c6}$ extending from face-to-face thereof. The piston $434^{c5}$ is rigidly carried by the body 460 through a rod that extends upwardly from the piston and is threaded into a tapped opening provided therefor in the body 460. The piston rod also extends downwardly through the plug $434^{c4}$, and sealing means or packings surround the piston stem so as to sealingly relate the same to the control element $434^{c}$ and prevent the escape of a viscous fluid, such as oil, from the chamber $434^{c3}$. Such chamber together with the piston $434^{c5}$, restricted passage $434^{c6}$ therethrough, and the viscous material within the chamber constitute a damping means that yieldingly resists movement of the control element $434^{c}$ relative to the piston $434^{c6}$. This arrangement makes the automatic control piston responsive only to changes in the mean position of the vibratory displacements of the body 420 and piston 452 relative to the casing 456 and body 460 in which the occurrence of vibration is objectionable.

Fluid under pressure, compressed air for example, is supplied to the constant-pressure space through a supply passage 486 adapted to be connected to an appropriate source of such fluid. The passage 486 communicates with a restricted infeed orifice $434^{a1}$ comprising two or more openings, at least certain of which are spaced from each other along the axis of reciprocation of the vibratory body. The infeed orifice is traversed by the control piston $434^{c1}$ and, in the position thereof illustrated in FIGURE 4, such infeed orifice is completely closed by the control piston. The intermediate portion of the control element defines with the circumjacent inner walls of the sleeve 461 a chamber $434^{a1}$ that is adapted to communicate with the infeed orifice whenever the control element $434^{c}$ is displaced upwardly by a sufficient distance. Connected with the chamber $434^{a2}$ is a passage $434^{a3}$ that is in continuous communication with the constant-pressure space. Thus, when the control element is displaced upwardly, fluid under pressure flows into the constant-pressure space from the supply passage 486, infeed orifice $434^{a1}$, chamber $434^{a2}$, and passage $434^{a3}$.

Adapted to communicate with the chamber $434^{a2}$ is an exhaust $434^{b1}$ with a passage $434^{b3}$ that vents the manifold chamber to atmosphere. The exhaust outlet comprises two or more openings, at least certain of which are spaced from the others along the axis of reciprocation of the vibratory body 420. In the condition of the structure shown in FIGURE 4, the exhaust outlet is completely closed by the control piston $434^{c2}$ which is adapted to traverse the same. When such control piston is displaced downwardly by a sufficient distance, the exhaust outlet $434^{b1}$ communicates with the chamber $434^{a2}$, and such configuration permits pressure fluid to escape from the constant-pressure space through the passage $434^{a3}$, chamber $434^{a2}$, exhaust outlet $434^{b1}$, manifold chamber $434^{b2}$, and passage $434^{b3}$.

The lower and upper ends of the control element $434^{c}$ are maintained at atmospheric pressure, the former through the passage 454 in the tube 453, and the latter through a passage 462 that communicates with the upper end portion of the control element through the manifold chamber end port illustrated.

Inspection of FIGURE 4 makes it evident that the cylinder casing 456 and casing 458 are formed of a material having good thermal-insulating properties. Many of the well known and commercially available synthetic thermo-setting resin plastic compositions have this characteristic and, as a consequence, these components are indicated in the drawing as being made of plastic. It will be apparent that various insulating techniques, materials and compositions may be employed to obtain the requisite insulating characteristics, the purpose of which is to retard or minimize the transfer of heat to and from the pressure fluid within the chamber 468 and cylinder 474.

The tapered or varying-diameter cylinder 474 is advantageously employed to obtain substantially perfect constancy of the pressure within the constant-pressure space during any reciprocatory displacement of the vibratory body 420 and the piston 456. In this respect, it should be noted that, as the piston 452 is displaced upwardly within a cylinder, the area of the upper transverse surface of the piston, which is defined by the element $434^{d1}$ and seal $434^{d2}$, decreases, whereupon the pressure force acting downwardly on the piston decreases in value because it is equal to the pressure within the constant-pressure space multiplied by the area of such transverse surface of the piston. Conversely, as the body 420 and piston 425 are reciprocated downwardly, the area of the transverse upper surface of the piston 452 progressively increases, because the seal $434^{d2}$ is progressively increasing in its radial dimension. Consequently, the pressure force acting downwardly on the piston 452 increases in value because the effective area against which it acts has been increased.

Quite evidently then, when the volume of the constant-pressure space is being decreased by an upward displacement of the piston 452, which ordinarily would tend to increase the value of the pressure within the constant-pressure space and, necessarily, impose a larger-valued downwardly acting pressure force on the piston, the effective area against which such pressure force is acting is simultaneously decreasing and, as a result, the constancy of the force transmitted between the unavoidably vibrating body 420 (and piston 452) and the body 460 in which the occurrence of vibration is objectionable (and the casing 458) is substantially perfectly attained throughout each such upward vibratory reciprocation. Precisely the same relationships obtain during downward displacements of the piston 452, but in a reverse manner, as previously explained; and, therefore, the constancy of the force transmitted between the two bodies is substantially perfectly attained for any vibratory displacement of the piston 452 and body 420. It should be appreciated that the described cylinder and piston structure permits the volume of the constant-pressure space and, in particular, the chamber 468 to be materially decreased, and with proper design, which involves a straight forward mathematical computation, the chamber 468 may be omitted altogether. Minimizing the transfer of heat to and from the pressure fluid within the constant-pressure space is a further refinement that aids in maintaining the constancy of the force transmitted between the bodies 420 and 460, in that temperature changes in such pressure fluid are avoided which might otherwise cause the change in the pressure thereof.

In operation of the structure, the body 420 and elements carried thereby are subject to vibratory displacements in the direction indicated by the arrow, and such vibatory displacements cause the piston 452 to reciprocate within the cylinder 474. Such vibratory displacements do not transmit corresponding vibratory displacements to the casing 458 and body 460 in which the occurrence of vibration is objectionable, because the force transmitted by the linkage between such two bodies remains substantially constant for the reasons set out in detail hereinbefore.

Such vibratory displacements of the body 420 are ordinarily of relatively brief duration, and by way of example, if the body 420 comprises the inner vibratory percussive tool structure, as described in copending patent application, Serial No. 186,198 filed April 9, 1962, the frequency of such vibratory displacements may be in the order of 1200 cycles per minute. The control element $434^c$ is floatingly supported by and between the springs $434^{c7}$ and $434^{c8}$, and it remains in the position illustrated in FIGURE 4 during any such vibratory displacement of the body 420 and piston 452, because movement of the control element is resisted by the viscous fluid within the chamber $434^{c3}$. The rate of response of the control element is determined by the size of the restricted passage $434^{c6}$ and the viscosity of the fluid within the chamber $434^{c3}$. Thus, when the piston 452 and tube 453 are displaced upwardly, the spring $434^{c7}$ is compressed, and the upwardly directed force exerted thereby against the element $434^c$ is necessarily increased in accordance with Hook's Law. However, the element $434^c$ is not immediately displaced upwardly because of the increased value of the spring force acting thereagainst because it can only move upwardly as rapidly as the viscous fluid can flow through the passage $434^{c6}$. Conversely, downward reciprocation of the piston 452 and tube 453 permits the spring $434^{c7}$ to expand and, as a consequence, the biasing force thereof acting upwardly against the control element $434^c$ is reduced in value, but the control element can not move downwardly immediately because the rate of response thereof is limited by the rate at which the viscous fluid flows through the passage $434^{c6}$. Therefore, the control element is not responsive to each vibratory displacement of the body 420 and piston 452.

If, however, the mean postion of the range of vibratory displacements of the body 420 and piston 352 should shift or migrate from the normal position thereof, the control element will respond thereto, and regulatively adjust the value of the pressure within the constant-pressure space to return the mean position of the range of vibratory reciprocations of the element 420 to its normal location. For example, if such mean position moves upwardly as viewed in FIGURE 4, the control element $434^c$ will move upwardly at the rate permitted by the damping means. The control piston $434^{c1}$ will uncover the inlet orifice $434^{a1}$ in accordance with the extent of the upward displacement of the control element, pressure fluid will flow through the infeed orifice and into the constant-pressure space, whereupon the pressure therein will increase in value because escape of pressure fluid therefrom is prevented by the control piston $434^{c2}$, which maintains the exhaust outlet in a closed condition. The pressure will continue to rise in the constant-pressure space until the value thereof is sufficiently great to force the piston 452 downwardly and thereby return the means position of its vibratory displacements to the prior normal location. Conversely, if such means position shifts downwardly, the control element $434^c$ will move downwardly, the exhaust outlet $434^{b1}$ will be uncovered by the piston $434^{c2}$, and pressure fluid will be permitted to escape from the constant-pressure space. The pressure fluid will continue to escape until the value of the pressure within the constant-pressure space is decreased sufficiently in value to permit the piston 452 to move upwardly, and thereby return the mean position of its vibratory reciprocations to the prior normal location.

The force transmitting linkage and automatic control control system is also operative to regulatively adjust the value of the pressure within the constant-pressure space to compensate for changes in the magnitude of a loading force tending to urge the bodies 420 and 460 toward each other. For example, if the body 460 has a downwardly oriented force acting thereon, such as where the body 460 is the outer handle-equipped casing of a 2-casing percussive tool and a feeding force or manual down-push is being applied thereto, and the magnitude of such force is suddenly increased, the body 460 and casing 458 will be displaced downwardly. The maintenance of such increased magnitude will cause the control element $434^c$ to be displaced upwardly, since the spring $434^{c7}$ will be compressed by such downward movement. The reason that the spring is compressed is that the piston $434^{c5}$ necessarily moves downwardly with the body 460, as does the sleeve 461 and the control element $434^c$ is also caused to move downwardly because the viscous fluid within the chamber $434^{c3}$ is essentially non-compressible. Thus, the spring force will cause the control elment to move upwardly to uncover the inlet orifice, and the addition of pressure fluid to the constant-pressure space will cause the value of the pressure therein to increase, and the casing 468 and body 460 will be moved upwardly to their prior stable condition relative to the body 420 and piston 452. Corrective response of the control system occurs in a reversely but analogous manner if the loading force on the body 460 is suddenly decreased in magnitude. Therefore, the automatic control system compensates for changes in the value of any such loading force, and enforces a positional stability upon the relatively reciprocable structures, in which they are maintained in a substantially continuous condition of impact-preventing separation or intermediacy.

The axially spaced openings that define the restricted infeed orifice in the structure shown in FIGURES 1 through 3, and that define the exhaust outlet in the structure of FIGURE 4, attenuate the response of the corrective actions of the control systems in that they effectively convert such response from a step function to a continuous function. Therefore, any tendency of the control system to over-correct is minimized.

While in the foregoing specification embodiments of the invention have been set forth in considerable detail for purposes of making and an adequate disclosure thereof, it will be apparent to those skilled in the art that numerous changes may be made in such details without departing from the spirit and principles of the invention.

I claim:
1. In a tripartite vibratile structure, a casing element provided with a cylinder having a piston element therein axially reciprocable with respect thereto, one of said elements being an element in which the occurrence of vibration is objectionable and the other thereof being a vibratory element capable of displaying with respect thereto both relatively short-interval axial vibratory reciprocations and longer-interval axial displacements, inlet means for supplying gas under pressure to said cylinder to establish therewithin a gaseous column operative between said piston and casing elements for transmitting a necessary axial force therebetween, such column being varied in length by reciprocatory motion of said piston element relative to said casing element with attendant variation of pressure in the column, means for maintaining a sealing relation between said piston element and cooperative cylinder surface, said cylinder along at least a portion of the length thereof being conformed to provide a varying cross-sectional area so related to the reciprocatory movements of said piston element with respect thereto that substantially no variation occurs in the pressure-generated axial force transmitted between said elements during any such short-interval vibratory reciprocation of said vibratory element, outlet means for permitting the escape of gas from said cylinder, and automatic control means for regulating the relative rates of the supply of gas to and the escape of gas from said cylinder to selectively increase or decrease the mean value of the pressure within such column in relation to any such longer-interval axial displacement of said vibratory element relative to said other element so as to substantially continuously maintain a predetermined mean positional relation between said elements irrespective of the application of any force tending to destroy such positional relation by producing such a longer-interval axial displacement therebetween, whereby both force-invariable axial positional stability and the prevention of the transmission of axial vibration between said two elements are realized in said tripartite vibratile structure.

2. In a tripartite vibratile structure, a casing element provided with a cylinder having a piston element therein axially reciprocable with respect thereto, one of said elements being an element in which the occurrence of vibration is objectionable and the other thereof being a vibratory element capable of displaying with respect thereto both relatively short-interval axial vibratory reciprocations and longer-interval axial displacements, inlet means for supplying gas under pressure to said cylinder to establish therewithin a gaseous column operative between said piston and casing elements for transmitting a necessary axial force therebetween, such column being varied in length by reciprocatory motion of said piston element relative to said casing element with attendant variation of pressure in the column, means for maintaining a sealing relation between said piston element and cooperative cylinder surface, means for compensating such variation of pressure in such column associated with such relative reciprocatory motion of said elements so as to maintain substantial constancy in the value of the total axial force transmitted between said elements during any such short-interval vibratory reciprocation of said vibratory element, outlet means for permitting the escape of gas from said cylinder, and automatic control means for regulating the relative rates of the supply of gas to and the escape of gas from said cylinder to selectively increase or decrease the mean value of the pressure within such column in relation to any such longer-interval axial displacement of said vibratory element relative to said other element so as to substantially continuously maintain a predetermined mean positional relation between said elements irrespective of the application of any force tending to destroy such positional relation by producing such a longer-interval axial displacement therebetween, whereby both force-invariable axial positional stability and the prevention of the transmission of axial vibration between said two elements are realized in said tripartite vibratile structure.

3. The structure of claim 2 in which said inlet means includes an inlet orifice and said outlet means includes an outlet orifice, and in which said automatic control means includes structure for traversing said inlet and outlet orifices to maintain a selectively variable control over the flow of gas therethrough and thereby regulate the relative rates of the supply and escape of gas to and from said cylinder.

4. The structure of claim 3 in which said orifice-traversing structure is operative to close both said inlet and outlet orifices while the aforementioned predetermined mean positional relation is effective between said casing and piston elements and is responsive only to a shift therefrom effected by an aforementioned longer-interval displacement to selectively open either said inlet or outlet orifice in accordance with the direction of such shift to permit gas to be appropriately supplied to or to escape from said cylinder until said elements are returned to such predetermined mean positional relation.

5. The structure of claim 2 in which a time delay device is included in said automatic control means to constrain the same against corrective operation during any short-interval vibratory reciprocation of said vibratory element and thereby make said control means responsive only to changes from such predetermined mean positional relation effective by such longer-interval displacements.

6. The structure of claim 5 in which said time delay device comprises a viscous damping mechanism.

7. The structure of claim 2 in which said gaseous column is defined within a structurally confined gaseous volume.

8. The structure of claim 7 in which the confining structure for such gaseous volume is comprised within said casing element.

9. The structure of claim 8 in which said confining structure comprises substantially nonpermeable thermal insulating material to substantially eliminate pressure-varying heat migrations between said confining structure and such gaseous volume.

10. In a tripartite vibratile structure, a pair of relatively reciprocable elements one thereof being an element in which the occurrence of vibration is objectionable and the other being a vibratory element capable of displaying with respect thereto both relatively short-interval vibratory reciprocations and longer-interval axial displacements, connecting linkage for effectuating a necessary transmission between said elements of a force controlled to enforce a predetermined mean relative position therebetween about which mean position such short-interval vibratory reciprocations normally occur, means for maintaining the value of the force transmitted through said linkage relatively constant throughout any such short-interval axial vibratory reciprocation of said vibratory element, and automatic control means for adjusting the value of such transmitted force in response to any such longer-interval axial displacement of said vibratory element relative to said other element so as to substantially continuously maintain a predetermined mean positional relation between said elements irrespective of the application of any force tending to destroy such positional relation by producing such a longer-interval axial displacement therebetween, said control means including a time delay device effective to constrain the same against corrective operation during any such short-interval vibratory reciprocation of said vibratory element and thereby make said control means responsive only to such longer-interval displacements.

11. In a tripartite vibratile structure, a casing element provided with a cylinder having a piston element therein axially reciprocable with respect thereto, one of said elements being an element in which the occurence of vibration is objectionable and the other thereof being a vibratory element capable of displaying with respect thereto both relatively short-interval axial vibratory reciprocations and longer-interval axial displacements, inlet means for supplying gas under pressure to said cylinder to establish therewithin a gaseous column operative between said piston and casing elements for transmitting a necessary axial force therebetween, such column being varied in length by reciprocatory motion of said piston element relative to said casing element with attendant variation of pressure in the column, means for maintaining a sealing relation between said piston element and cooperative cylinder surface, means for compensating such variation of pressure in such column associated with such relative reciprocatory motion of said elements so as to maintain substantial constancy in the value of the total axial force transmitted between said elements during any such short-interval vibratory reciprocation of said vibratory element, outlet means for permitting the escape of gas from said cylinder, and automatic control means for regulating the relative rates of the supply of gas to and the escape of gas from said cylinder to selectively increase or decrease the mean value of the pressure within such column in relation to any such longer-interval axial displacement of said vibratory element relative to said other element so as to substantially continuously maintain a predetermined mean positional relation between said elements irrespective of the application of any force tending to destroy such positional relation by producing such a longer-interval axial displacement therebetween, said automatic control means including a time delay device effective to constrain the same against corrective operation during any such short-interval vibratory reciprocation of said vibratory element and thereby make said control means responsive only to such longer-interval displacements, whereby both force-invariable axial positional stability and the prevention of the transmission of axial vibration between said two elements are realized in said tripartite vibratile structure.

12. The tripartite vibratile structure of claim 11 in which said cylinder along at least a portion of the length thereof is conformed to provide a varying cross-sectional area so related to the reciprocatory movements of said piston element with respect thereto that substantially no variation occurs in the pressure-generated axial forces transmitted between said element during any such short-interval vibratory reciprocation of said vibratory element, the aforesaid means for compensating variation of pressure in such column including such conformation of said cylinder.

References Cited by the Examiner

UNITED STATES PATENTS

| | | | |
|---|---|---|---|
| 971,583 | 10/10 | Bell | 267—65 |
| 1,105,805 | 8/14 | Liebowitz. | |
| 1,861,821 | 6/32 | Schaum | 267—15 |
| 2,021,043 | 11/35 | Bedford et al. | 267—15 |
| 2,838,300 | 6/58 | Gray | 267—1 |
| 2,907,578 | 10/59 | Taber. | |
| 2,923,557 | 2/60 | Schilling et al. | 267—64 |
| 2,965,372 | 12/60 | Cavanaugh | 267—1 |
| 2,973,968 | 3/61 | Behles | 267—65 X |
| 3,014,714 | 12/61 | Trevaskis | 267—65 |
| 3,027,152 | 3/62 | Deschner | 267—1 |
| 3,028,841 | 4/62 | Leavell | 267—1 |

FOREIGN PATENTS

| | | |
|---|---|---|
| 1,161,423 | 3/58 | France. |
| 1,220,135 | 1/60 | France. |
| 972,828 | 10/59 | Germany. |

OTHER REFERENCES

German Application 1,047,639, printed Dec. 24, 1958 (K163c41).

ARTHUR L. LA POINT, *Primary Examiner.*
ROBERT C. RIORDON, *Examiner.*